Nov. 26, 1968    JEAN-LOUIS R. RIEHL ET AL    3,413,546
ELECTRONIC CIRCUITRY FOR ANALYZING
ELECTROENCEPHALOGRAPHIC WAVEFORMS
Filed Dec. 28, 1965    3 Sheets-Sheet 1

INVENTORS
JEAN-LOUIS RIEHL
MOHAMMED I. HUSSAIN
BY Burns, Doane, Benedict, Swecker
& Mathis
ATTORNEYS

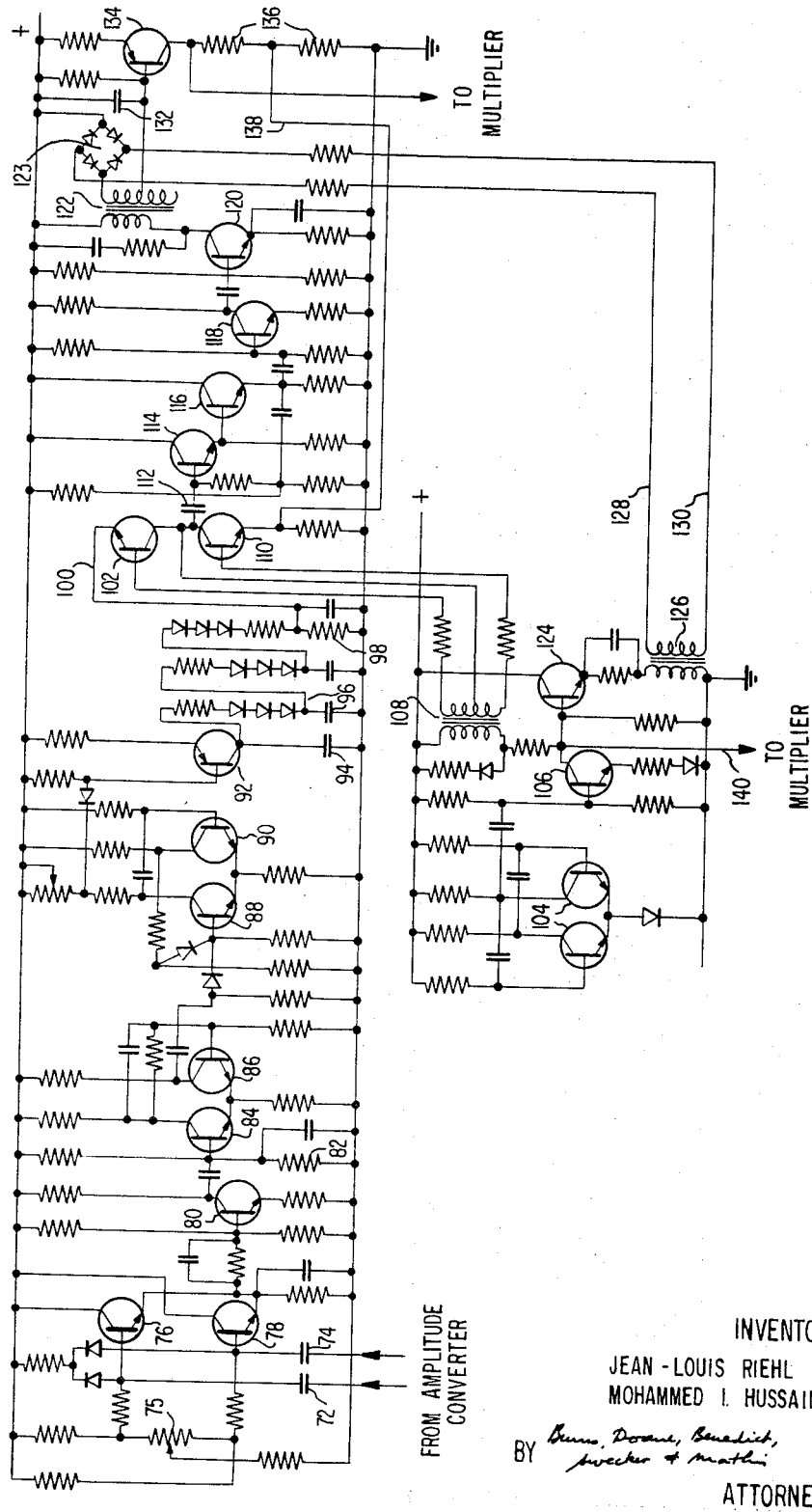

:
United States Patent Office 3,413,546
Patented Nov. 26, 1968

3,413,546
ELECTRONIC CIRCUITRY FOR ANALYZING
ELECTROENCEPHALOGRAPHIC WAVEFORMS
Jean-Louis R. Riehl and Mohammed Imam Hussain, Los Angeles, Calif., assignors to Thiokol Chemical Corporation, Bristol, Pa., a corporation of Delaware
Filed Dec. 28, 1965, Ser. No. 516,934
14 Claims. (Cl. 324—77)

ABSTRACT OF THE DISCLOSURE

An electronic system for analyzing electroencephalographic waveforms to evaluate cerebral activity by providing an output signal representing the quotient of the frequency divided by the voltage amplitude of the waveform. This is accomplished by generating a first output signal inversely proportional to the voltage amplitude of the waveform, and a second output signal directly proportional to the frequency of the waveform. These output signals are then multiplied to provide a third output signal proportional to the quotient of the frequency divided by the voltage amplitude of the waveform. This third output is then fed to suitable indicating apparatus. In addition, the third output signal may be periodically integrated to provide an indication of low grade chronic changes.

---

This invention relates to analysis of waveforms and more particularly to the analysis of electroencephalographic waveforms.

Electroencephalography is a recognized method of testing and studying the function of a patient's brain by electrical signals derived from electrodes on the patient's head. This method of brain study has been found to be readily usable both in clinical and research studies, but its practical application has long been limited by the extensive training and experience required for an operator of the electroencephalograph to perform a qualified visual interpretation of the recorded waveforms.

Automatic methods have thus heretofore been developed to reduce the specialized training required to correctly interpret electroencephalographic waveforms. For instance, frequency analyzers have been developed which directly record the existing frequencies in a certain time interval of the waveform. However, in this method, the temporal sequence of the waveform is lost and complex equipment is required. Additionally, automatic analyzation methods have been developed which utilize cross-correlation functions of the electroencephalographic record. These methods are able to analyze only very short time durations of the waveform of one channel, and require hours of processing. Other methods heretofore known have utilized power spectrum analysis and coherence functions, but they require detailed programming of highly complex computers. Also, period analyzers which convert the base line crosses, maximum-minimum points, and points of inflection of electroencephalographic waveforms into a series of vertically displayed data channels have not generally been found to provide an easily-read, yet rapid and precise, analysis of the electrical waveforms resulting from the activity of the brain.

The instant invention provides direct means for an accurate evaluation of an electroencephalographic record on a "real-time" basis. The evaluation may be made by an operator without special knowledge of electroencephalography, as the present invention provides a single value indication in either an analog or numerical display.

The system of the present invention depends upon a fundamental physiological relationship between the frequency and the corresponding voltage amplitude of an electroencephalographic waveform. By continuously indicating a ratio of the frequency and amplitude of the waveform, and preferably the quotient of the frequency divided by the voltage amplitude of the waveform, the present invention enables an evaluation of the cerebral activity indicated by the waveform. For instance, during low level brain activity, such as inattention or sleep, the said quotient will have a low voltage level. During alertness or stimulation, the voltage level of the quotient will be relatively high. Additionally, by periodically integrating the quotient, chronic slow grade changes in the electroencephalograph may be detected.

The system of the present invention provides a continuous indication of the quotient of the frequency divided by the voltage amplitude of an electroencephalographic waveform, without requiring complex and expensive divider circuitry or analog computers. Rather, the instant invention utilizes transistorized multipliers which require a minimum of circuitry and which are stable and reliable. Additionally, the present invention, by the utilization of chopper techniques and alternating current amplification, enables accurate amplification of direct current outputs without the accompanying problems of amplifier drift and subsequent amplification inaccuracies.

Accordingly, a general object of the present invention is the provision of electroencephalographic waveform analyzing circuitry which substantially eliminates or minimizes the disadvantages of waveform analyzing circuitry heretofore available.

A more specific object of the present invention is the provision of electroencephalographic waveform analyzing circuitry which enables observation of the relationship between the frequency and the voltage amplitude of an electroencephalographic waveform.

Another object is the provision of electroencephalographic waveform analyzing circuitry which does not require complex dividing circuits.

Yet another object of the instant invention is the provision of electroencephalographic waveform analyzing circuitry which enables accurate, continuous amplification of direct current voltage signals.

A further object of the instant invention is the provision of an electroencephalographic waveform analyzing apparatus which presents a substantial "real-time" evaluation of the waveform in the form of single value displays, so that no special knowledge of the waveform is required for the operator of the apparatus.

Yet a further object is the provision of an economical, yet accurate and reliable, electroencephalographic waveform analyzing apparatus.

In achieving these and other objects that will be apparent hereinafter, the instant invention provides apparatus for analyzing electroencephalographic waveforms which utilizes a first signal conversion circuit to provide a first output signal having a frequency inversely proportional to the amplitude of the electroencephalographic waveform. A second signal conversion circuit is also utilized to provide a second output signal having a magnitude directly proportional to the frequency of the electroencephalographic waveform. By providing first and second output signals of this relationship, the quotient function may be directly obtained by multiplication. The multiplier circuit is responsive to both of the output signals to provide a third output signal directly proportional to the quotient of the frequency divided by the amplitude of the electroencephalographic waveform. This third output signal has been found to present a useful indication of the activity of the patient's brain and thus is displayed to allow clinical or research interpretation of the patient's cerebral activity. A periodic integrator circuit may also be provided to give an indication of low grade chronic changes in the electroencephalographic waveforms.

The invention and it many advantages may be further understood by reference to the following detailed description illustrated in the accompanying drawings, in which:

FIGURE 3 is a schematic diagram of the frequency converter circuitry of the instant invention;

Figure 1:
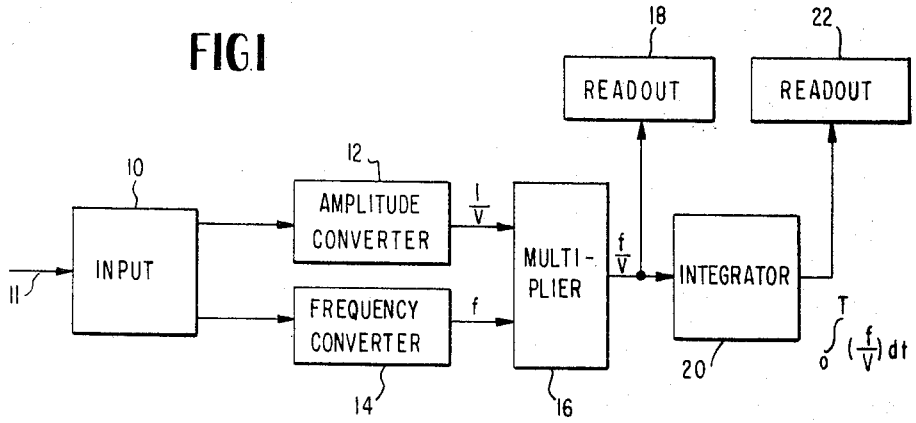
FIGURE 1 is a block diagram of apparatus for determining and recording relationships of electroencephalographic waveforms according to the instant invention.

Referring now to FIGURE 1, the input 10 receives a primary electrical signal 11 representative of an electroencephalographic waveform. The primary electrical signal 11 is usually provided by an electrode attached to a patient's head which detects an electrical signal produced by the patient's brain waves. Generally, electrodes will be symmetrically disposed on two sides of the patient's head, and the resultant primary electrical signals from each side of the patient's head are fed to identical analyzation channels. In describing the present invention, only one channel of the analyzation circuitry will be described, although it will be understood that by the utilization of two channels of the circuitry of the present invention, simultaneous comparisons may be made of electroencephalographic waveforms obtained from different regions of a patient's brain.

After suitable amplification in the input 10, the primary electrical signal is simultaneously fed into both the amplitude converter 12 and the frequency converter 14. The amplitude converter 12 provides a first output signal having a frequency inversely proportional to the amplitude of the primary electrical signal, while the frequency converter 14 provides a second output signal having a magnitude directly proportional to the frequency of the primary electrical signal. Both of these output signals are fed into the multiplier 16, which provides a third output signal directly proportional to the quotient of the frequency of the primary electrical signal divided by the amplitude of the primary electrical signal.

This third output signal may be supplied to a conventional digital readout 18, or if desired, may be fed to a chart recorder in order to allow visual study and observation of the physiological relationship between the frequency and the amplitude of the electroencephalographic waveform. As previously discussed, during low level cerebral activity of the patient, such as light sleep or inattention, the resulting quotient from the multiplier 16 will have a low value. In contrast, during alertness or stimulation of the patient, the resulting quotient output from the multiplier 16 will have a relatively high value. The third output signal from the multiplier 16 is additionally fed into the integrator 20, which periodically integrates the quotient output over a predetermined time interval, such as ten seconds. These periodically integrated outputs could be presented in a readout 22, or utilized to drive a chart recorder or the like.

Figure 2:
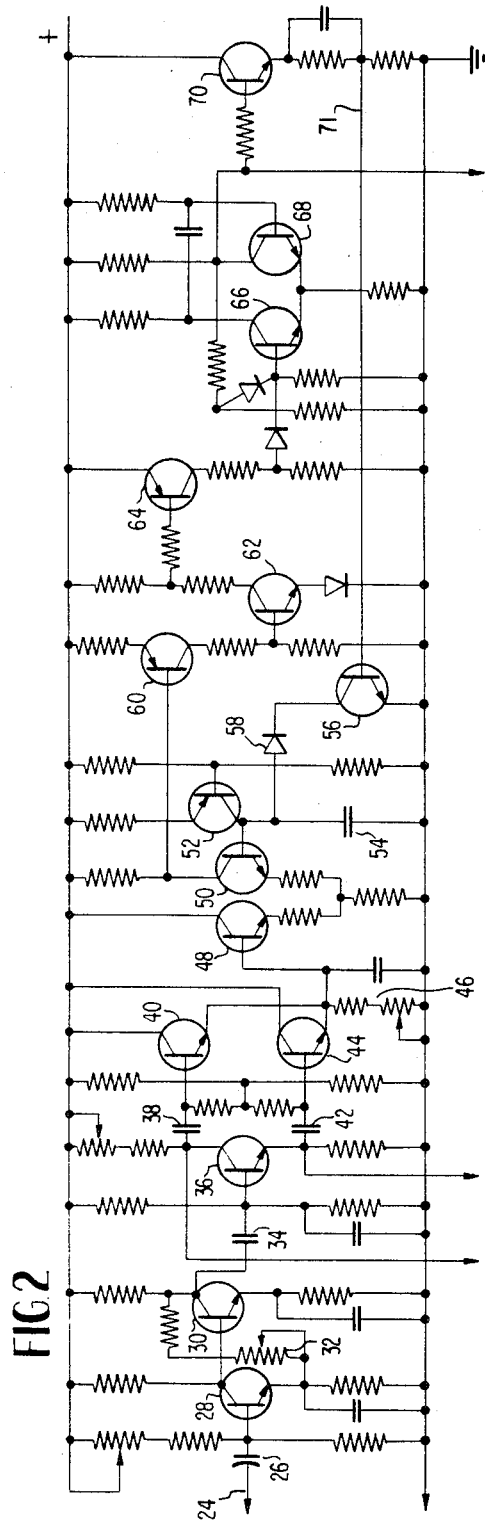
FIGURE 2 is a schematic diagram of the amplitude converter circuitry of the present invention.

FIGURE 2 is a detailed schematic drawing of the circuitry of the input 10 and the amplitude converter 12 shown in FIGURE 1. A primary electrical signal representative of the electroencephalographic waveform is preamplified by suitable means (not shown) and fed to the input terminal 24. Coupling capacitor 26 feeds the primary electrical signal to a two-stage transistor amplifier comprising transistors 28 and 30 and including a variable resistor 32 for adjusting the magnitude of negative feedback utilized in the amplifier.

The amplified signal is then fed through capacitor 34 to the transistor 36, where the signal is split into two components, each having substantially the same waveform as the primary electrical signal. However, the signal appearing at the collector of transistor 36 has a waveform of an inverted polarity with respect to the signal component appearing at the emitter of transistor 36 and to the primary electrical signal. The inverted signal component is coupled through the capacitor 38 to the base of transistor 40 for emitter follower rectification. Similarly, the signal component appearing at the emitter of transistor 36 is fed through capacitor 42 to the base of the transistor 44 for rectification. The two rectified components are added at the emitter of transistor 44 to present a voltage representative of the amplitude of the primary electrical signal. By emitter follower rectification of the two signal components having opposite polarities, very low voltage levels may be analyzed, instead of being lost due to inherent thresholds of conduction in conventional diode rectification.

The rectified voltage is smoothed by the filter circuit 46 and fed to the base of transistor 48. Transistors 48 and 50 comprise a voltage comparator circuit which develops an error signal whenever the input signal applied to the base of transistor 48 substantially changes. Transistor 52, in connection with capacitor 54, generates a ramp voltage which rises linearly with time from a fixed reference voltage determined by the emitter-to-collector saturation voltage of transistor 56 in addition to the voltage drop of diode 58. Thus, when transistor 56 is saturated, the voltage across capacitor 54 is equal to the reference voltage level. When transistor 56 becomes nonconductive, the voltage across capacitor 54 begins to build up until its magnitude equals, or begins to exceed, the voltage level of the input signal at the base of transistor 48. This causes the collector of transistor 50 to become more negative, thus generating a negative error signal which is fed to the base of transistor 60.

Transistor 60 is normally biased by its associated circuitry into a cut-off condition. Upon the occurrence of a negative error signal, transistor 60 amplifies the portion of the negative input which exceeds its cut-off threshold and feeds the amplified signal to the base of normally nonconductive transistor 62, where the signal is further amplified and utilized to drive the transistor 64 into conduction. The amplified output signal from transistor 64 drives a conventional monostable multivibrator comprised of transistors 66 and 68 into its unstable state, in order to provide an output pulse having a fixed amplitude and time duration to the base of transistor 70. The emitter follower configuration of transistor 70 produces an output signal which through lead 71 drives transistor 56 into saturation for the duration of the pulse received from the multivibrator. As previously described, the saturation of transistor 56 discharges capacitor 54 back down to the reference voltage level determined by transistor 56 and diode 58, from which the capacitor again begins to charge after the duration of the multivibrator pulse in order to again institute the voltage comparison cycle.

It will thus be understood that the time duration of each voltage ramp generated by capacitor 54 is in direct proportion to the voltage level of the signal appearing at the base of transistor 48. It then follows that the frequency of repetition of these ramps is inversely proportional to the voltage level of the signal appearing at the base of transistor 48, multiplied by a constant calibrating factor dependent upon the values of the circuitry. Additionally, as the frequency of the multivibrator comprising transistors 66 and 68 is dependent upon the occurrence of error signals marking the frequency of the ramps, the frequency of the multivibrator is also inversely proportional to the magnitude of voltage appearing at the base of transistor 48. The frequency of the pulses produced by the multivibrator is thus utilized as a first output signal to the multiplier circuitry shown in FIGURE 1, to be subsequently described in more detail.

The inverted signal component appearing at the collector of transistor 36 and the signal component appearing at the emitter of transistor 36 are additionally fed to the frequency converter circuitry illustrated in FIGURE 3. The signal components are coupled through capacitors 72 and 74 to the bases of transistors 76 and 78, where the components are emitter follower rectified. The potentiometer 75 adjusts the balance of the two rectifying transistors 76 and 78. The rectified components are added at the emitter of transistor 78 and capacitively coupled to the base of transistor 80, where the resultant signal is amplified and then slightly filtered by the filter network 82. The resulting full-wave rectified signal presents two positive voltage peaks for each full cycle of the primary electrical signal.

The rectified signal, representing the frequency of the electroencephalographic waveform, is used to drive a Schmitt trigger circuit comprised of transistors 84 and 86 to provide a positive trigger pulse for each positive voltage peak of the full-wave rectified signal. These trigger pulses control the operation of a conventional multivibrator, including interconnected transistors 88 and 90, to provide a fixed amplitude and time duration pulse for each half cycle of the original primary electrical signal. Transistor 92 is driven by the multivibrator to feed a predetermined magnitude of current to capacitor 94 for a predetermined time interval during each multivibrator output pulse. The impulses applied to capacitor 94 are filtered by the capacitor-resistor-diode network 96 in order to present a voltage across resistor 98 having an amplitude representative of the frequency of the primary electrical signal.

In order to eliminate drift problems and other causes of inaccuracies inherent in the amplification of direct current voltage, the signal across resistor 98 is fed through lead 100 to the emitter of transistor 102, where the signal is chopped at a high frequency to allow alternating current amplification. A high frequency oscillator 104 comprised of two emitter coupled transistors and associated circuitry produces a high frequency chopping signal, such as 3.7 kilocycles, which is amplified by transistor 106 and utilized to drive the chopper circuit through a transformer 108. Transistor 110 is directly coupled to transistor 102 to provide direct current gain stabilization of the chopper circuit, as will later be described.

The modulated output of the chopper circuit is coupled through capacitor 112 to a conventional alternating current amplification circuit comprising transistors 114, 116, 118, 120, and associated circuitry. The amplified signal is then fed through a transformer 122 to a conventional diode bridge demodulator circuit 123, which is phase synchronized with the chopper frequency from oscillator 104 through transistor 124, transformer 126, and leads 128 and 130. The demodulated output voltage appearing across capacitor 132 drives transistor 134 in order to furnish the previously described second output signal to the multiplier circuit across a low impedance 136. A portion of the second output signal is fed back through lead 138 to the emitter of transistor 110 to provide direct current gain stabilization of the chopper circuit. A portion of the chopper frequency signal from the oscillator 104 is taken from the output of transistor 106 and fed through lead 140 to the modulating circuit in the multiplier, to be subsequently described.

Figure 4:
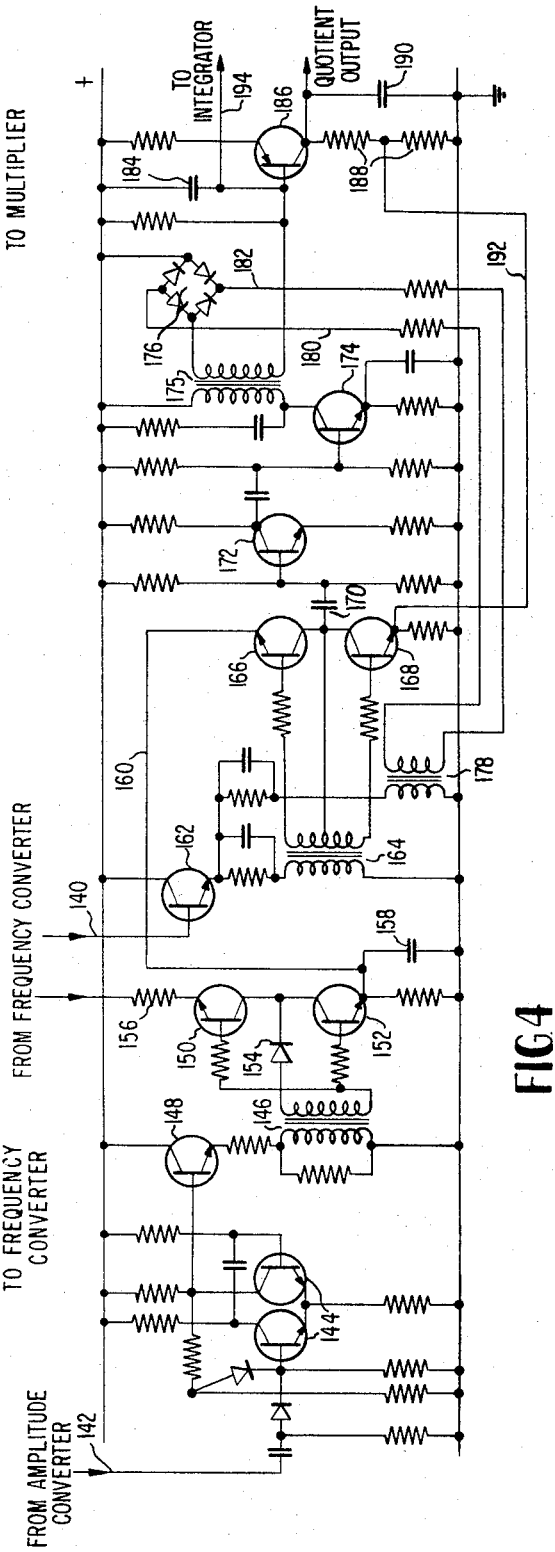
FIGURE 4 is a schematic diagram of the multiplier circuit of the present invention.

FIGURE 4 illustrates a detailed schematic drawing of the multiplier circuit, wherein a first output signal from the amplitude converter, comprising a train of pulses occurring at a rate inversely proportional to the amplitude of the primary electrical signal, is fed through lead 142 to a conventional monostable multivibrator 144. The resulting output pulses from the multivibrator 144 are supplied by the emitter of a transistor 148 to the transformer 146. The secondary winding of the transformer 146 is connected across a variable frequency chopper circuit comprised of transistors 150 and 152, and limiting diode 154. Hence, the multivibrator 144 causes the variable frequency chopper circuit to conduct each time the multivibrator 144 receives an output voltage from the amplitude converter.

The output from the frequency converter is applied to the variable frequency chopper comprised of transistors 150 and 152 through resistance 156 in order to control the magnitude of current conducted by the chopper during each peroid of conduction caused by the multivibrator 144. The current output of the chopper is fed to capacitor 158 to develop a voltage across capacitor 158 proportional to the product of the first and the second output signals. As the first output signal represents the inverse of the amplitude of the primary electrical signal and as the second output signal directly represents the frequency of the primary electrical signal, the voltage across capacitor 158 represents a third output signal equal to the quotient of the frequency divided by the amplitude of the primary electrical signal.

This third output signal is fed through lead 160 to a second chopper modulator to allow precise alternating current amplification. A high frequency chopping signal is provided through lead 140 from the frequency converter oscillator 104 (FIGURE 3) to drive the chopper through transistor 162 and transformer 164. This chopper is comprised of transistors 166 and 168 and chops the multiplier output at the predetermined chopper frequency to supply an alternating current signal output through capacitor 170 for amplification. Transistors 172 and 174 provide an amplified signal to a diode bridge demodulator 176 through a transformer 175. The demodulator is driven through transistor 162, transformer 178, and leads 180 and 182 to provide an amplified voltage across capacitor 184. Transistor 186 amplifies and inverts the voltage across capacitor 184 to furnish an output voltage across a low impedance 188 and a capacitor 190, the magnitude of the voltage being proportional to the quotient of the frequency divided by the amplitude of the primary electrical signal. A portion of this output is fed back through lead 192 to the emitter of transistor 168 to provide for direct current gain stabilization of the chopper.

It will be understood by one skilled in the art that this amplified output may be utilized to drive a chart recorder (not shown) or an electronic readout device (not shown) for neurological or drug research. Two separate channels of the above-described circuitry could be used to detect differences between the electroencephalographic waveforms of left-hand and right-hand regions of a patient's brain. This may allow an operator of the intsant apparatus to determine the site of a lesion of the brain by assessing the presence or absence of slow wave activity in one channel. From a strictly research point of view, this quotient output provides quantitative data from the electroencephalograph which enables rigorous, exacting evaluations of drug effects on a patient's central nervous system.

Figure 5:
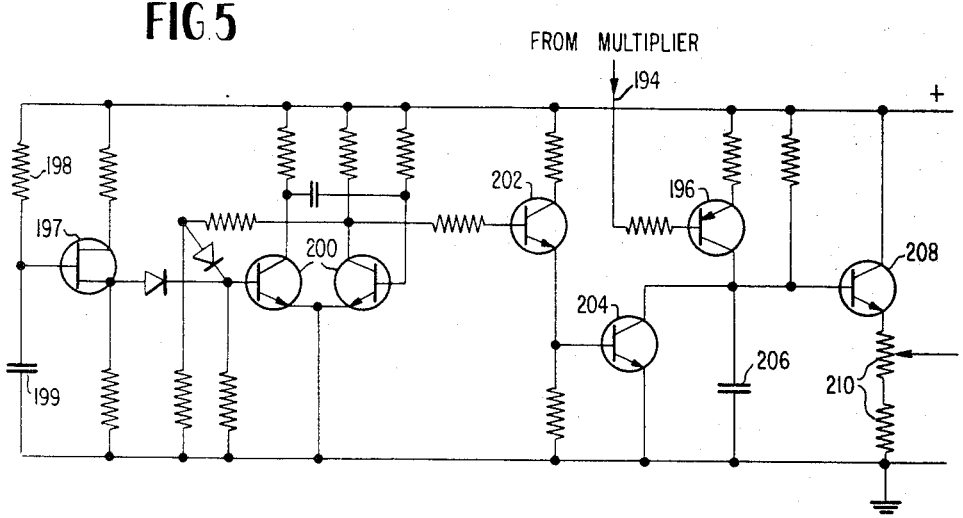
FIGURE 5 is a schematic diagram of the periodic integrator circuit.

As illustrated in FIGURE 5, the quotient output from the multiplier may be periodically integrated by feeding the voltage appearing across capacitor 184 (FIGURE 4) through lead 194 to the base of a transistor 196. A unijunction transistor 197 provides a series of trigger pulses having a very stable frequency determined by the magnitudes of resistor 198 and capacitor 199 to the input of a monostable multivibrator 200. In response to the trigger pulses, the multivibrator produces a fixed frequency train of constant amplitude and time duration pulses which are fed through an emitter follower connected transistor 202 to the base of a transistor 204. Transistor 204 is periodically saturated for a time interval determined by the oscillation frequency of the unijunction transistor 197. The quotient signal from the multiplier is then integrated across capacitor 206 during the interval between the periodic saturation of transistor 204.

When the transistor 204 is saturated, or clamped to ground, the voltage across capacitor 206 is discharged. However, the clamping of transistor 204 is very brief and the capacitor 206 immediately begins to charge up again, thereby providing a periodic integration of the quotient output from the multiplier. This integrated output is fed to the base of transistor 208, which is connected in an emitter follower configuration to supply the integrated output across a resistor 210.

As previously described, this periodically integrated signal may be use to drive a chart recorder or a digital readout (not shown). Normally, two channels of the above-described circuitry will be utilized, and both the quotient output and the periodically integrated output of each channel may be displayed on a conventional readout device. Additionally, an indication of the number of integration periods may be obtained from suitable circuitry and also displayed on the readout device. In this manner, an operator of the device may visually compare the displayed numerical values of the two channels in order to classify a subject's brain as normal or abnormal. The display of the number of integration periods may be useful to determine response times from time of drug injections or other externally caused stimulation. It will thus be understood that the present invention provides accurate and easily read data extremely useful for the interpretation of electroencephalographic waveforms in both clinical and research environments.

While a preferred embodiment has been described, the invention should not be limited to the exact apparatus illustrated, as various modifications of the apparatus which do not depart from the essence of the present invention will be obvious to those skilled in the art.

What is claimed is:

1. Apparatus for analyzing electroencephalographic waveforms comprising:
input means for receiving a primary electrical signal having electroencephalographic voltage amplitude and frequency parameters and an electroencephalographic waveform,
first signal conversion means responsive to said input means for providing a first output signal having an electrical characteristic inversely proportional to one of said parameters of the primary electrical signal,
a second signal conversion means responsive to said input means for providing a second output signal having an electrical characteristic directly proportional to the other of the said parameters of the primary electrical signal,
multiplier means responsive to both the first and second output signals for providing a third output signal having a magnitude proportional to a ratio of the frequency and voltage magnitude of the primary electrical signal, and
means for displaying said third output signal to enable analysis of the electroencephalographic waveform.

2. Apparatus for analyzing electroencephalographic waveforms comprising:
input means for receiving a primary electrical signal having an electroencephalographic waveform,
a first signal conversion means responsive to said input means for providing a first output signal having an electrical characteristic inversely proportional to the voltage amplitude of the primary electrical signal,
a second signal conversion means responsive to said input means for providing a second output signal having an electrical characteristic directly proportional to the frequency of the primary electrical signal,
multiplier means responsive to both the first and second output signals for providing a third output signal having a magnitude directly proportional to the quotient of the frequency over the voltage of the primary electrical signal, and
means for displaying said third output signal to enable analysis of the electroencephalographic waveform.

3. The apparatus of claim 2 and further including integrator means for integrating said third output signal over a predetermined time interval, and
means for displaying the integrated signal.

4. The apparatus of claim 3 wherein said integrator means comprises a capacitor means for integrating said third output signal, electronic clamping means connected across said capacitor means for discharging the voltage stored by said capacitor means, oscillator means connected to said electronic clamping means for periodically causing said clamping means to discharge the voltage stored by said capacitor means, and output means responsive to said capacitor means for providing a voltage representative of the periodic integration of said third output signal.

5. The apparatus of claim 3 wherein:
said input means comprises transistor means for providing two electrical signals having substantially the same waveform as said primary electrical signal, one of said two electrical signals being inverted in polarity with respect to said primary electrical signal,
each of said first and second signal conversion means comprising transistor emitter follower rectifier means for separately rectifying each of said two electrical signals,
said first signal conversion means comprising transistor voltage comparator means having a varying reference voltage level and being responsive to the output of said input means to provide an error signal whenever said varying reference voltage level exceeds the magnitude of the output of said input means, transistor multivibrator means responsive to said error signal to provide said first output signal, said first output signal being a series of constant amplitude and time duration pulses having a frequency inversely proportional to the amplitude of said primary electrical signal,
said second signal conversion means comprising transistor trigger means responsive to the output of said input means for providing two positive trigger pulses for each full cycle of said primary electrical signal, transistor monostable multivibrator means being responsive to said trigger pulses for providing a series of fixed amplitude pulses having a frequency representative of the frequency of said primary electrical signal, filter network means responsive to the series of fixed amplitude pulses for providing said second output signal, transistor amplifying means for said second output signal including a transistor modulator means being driven at a predetermined frequency in order to modulate said second output signal, alternating current amplifying circuits responsive to said modulator means for amplifying said modulated second output signal, demodulator means connected to said amplifying circuits to provide an amplified second output signal,
said multiplier means comprising a variable frequency transistor chopper means responsive to said first and second output signals to provide said third output signal, said transistor chopper means having periods of current conduction occurring at a rate proportional to the frequency of said first output signal, the magnitude of the current conducted by said chopper means being proportional to the voltage magnitude of said second output signal, and capacitor means connected to said transistor chopper means for storing a voltage representative of said third output signal, and
said integrator means comprising a capacitor for integrating said third output signal, a transistor being connected across said capacitor for discharging the voltage stored by said capacitor, unijunction transistor oscillator means connected to said transistor for periodically causing said transistor to discharge the voltage stored by said capacitor, and means responsive to said capacitor for providing a voltage representative of the periodic integration of said third output signal.

6. The apparatus of claim 2 wherein said first signal conversion means comprises means generating the first output signal at a frequency inversely proportional to the amplitude of the primary electrical signal.

7. The apparatus of claim 6 wherein said first signal conversion means includes voltage comparator means having a varying reference voltage level and being responsive to the output of said input means to provide an error signal whenever said varying reference voltage level exceeds the magnitude of the output of said input means, and multivibrator means responsive to said error signal to provide said first output signal comprising a series of constant amplitude and time duration pulses having a frequency inversely proportional to the amplitude of said primary electrical signal.

8. The apparatus of claim 2 wherein said second signal conversion means comprises means generating the second output signal at a voltage magnitude directly proportional to the frequency of the primary electrical signal.

9. The apparatus of claim 8 wherein said second signal conversion means includes trigger means responsive to the output of said input means for providing two positive trigger pulses for each full cycle of said primary electrical signal, monostable multivibrator means responsive to said trigger pulses for providing a series of fixed amplitude pulses having a frequency representative of the frequency of said primary electrical signal, and filter network means responsive to the series of fixed amplitude pulses for providing said second output signal.

10. The apparatus of claim 9 further including amplifying means for said second output signal, said amplifying means comprising chopper means being driven at a predetermined frequency in order to modulate said second output signal, alternating current amplifying circuits responsive to said chopper means for amplifying said modulated second output signal, and demodulator means connected to said amplifying circuits to provide an amplified second output signal.

11. The apparatus of claim 2 wherein said input means includes electronic means for providing two electrical signals having substantially the same waveform as said primary electrical signal, one of said two electrical signals being inverted in polarity with respect to said primary electrical signal, and each of said first and second signal conversion means including rectifier means for separately rectifying each of said two electrical signals.

12. The apparatus of claim 2 wherein said multiplier means comprises a variable frequency chopper means responsive to said first and second output signals to provide said third output signal, said chopper means having periods of current conduction occurring at a rate proportional to the frequency of said first output signal, the magnitude of the current conducted by said chopper means being proportional to the voltage amplitude of said second output signal, and capacitor means connected to said chopper means for storing the third output signal voltage representative of said quotient of the frequency over the voltage of the primary electrical signal.

13. The apparatus of claim 12 and including amplification means for said third output signal, said amplification means including a chopper circuit driven at a predetermined frequency for modulating said third output signal, alternating current amplifying means connected to said chopper circuit, and demodulator means connected to said amplifying means for demodulating the amplified third output signal.

14. The apparatus of claim 13 further including integrator means for integrating said third output signal over a predetermined time interval, and means for displaying the integrated signal.

No references cited.

RUDOLPH V. ROLINEC, *Primary Examiner.*

P. F. WILLE, *Assistant Examiner.*